United States Patent [19]
Hudgins

[11] Patent Number: 5,365,370
[45] Date of Patent: Nov. 15, 1994

[54] THREE DIMENSIONAL VIEWING ILLUSION WITH 2D DISPLAY

[76] Inventor: J. Stephen Hudgins, 923 Ballard Ct., Blacksburg, Va. 24060

[21] Appl. No.: 74,756

[22] Filed: Jun. 10, 1993

[51] Int. Cl.$^5$ .............................................. G02B 27/22
[52] U.S. Cl. .................................. 359/464; 359/462; 359/465; 359/466
[58] Field of Search .................. 359/462, 464–466; 358/3, 88, 92

[56] References Cited

U.S. PATENT DOCUMENTS

| | | | |
|---|---|---|---|
| 4,021,846 | 5/1977 | Roese | 358/92 |
| 4,461,541 | 7/1984 | Duthie | 359/465 |
| 4,562,463 | 12/1985 | Lipton | 358/88 |
| 4,649,425 | 3/1987 | Pund | 358/88 |
| 4,719,507 | 1/1988 | Bos | 358/92 |
| 4,740,836 | 4/1988 | Craig | 359/464 |
| 4,907,860 | 3/1990 | Noble | . |
| 4,959,641 | 9/1990 | Bass et al. | 340/700 |
| 4,987,487 | 1/1991 | Ichinose et al. | 359/464 |
| 5,002,387 | 3/1991 | Baljet et al. | 359/464 |
| 5,129,716 | 7/1992 | Holakovszky et al. | 351/50 |
| 5,146,246 | 9/1992 | Marks | 353/7 |

*Primary Examiner*—Eugene R. LaRoche
*Assistant Examiner*—Andrew Q. Tran
*Attorney, Agent, or Firm*—Larson and Taylor

[57] ABSTRACT

A method and system for creating a three dimensional viewing illusion in true color uses left and right images of a stereo pair which are designed to be viewed respectively by the left and right eyes of a viewer as a single three dimensional image. In synchrony therewith, light from a light source device is alternately shown to the right and left eyes of the viewer so that while the eyes do view both of the left and right stereo images, the contrast of the eye receiving both the light and the stereo image designed for the other eye is reduced. In the various embodiments, the light source device includes a left and a right light source. In one embodiment the light sources are collimated and suitably aimed at the respective eyes. Preferably, the position of the eyes are also tracked and the aiming of the sources is adjusted as the viewer moves. In another embodiment, the light sources are mounted adjacent the associated eye of the viewer on an object which is worn by the viewer. In still another embodiment, the light sources are polarized differently. Then, mounted to an object worn by the viewer is a left light filter device for preventing polarized light from the right light source from being passed and hence received by the left eye and a right light filter device for preventing polarized light from the left light source from being passed and hence received by the right eye.

13 Claims, 2 Drawing Sheets

THREE DIMENSIONAL VIEWING ILLUSION WITH 2D DISPLAY

FIELD OF THE INVENTION

The present invention relates generally to stereoscopy or the creating of a three dimensional viewing illusion from a two-dimensional display, and more particularly to a method and system for creating a three dimensional illusion from a two dimensional display using stereoscopic pairs of images and light to reduce the contrast of one eye in synchrony with the displaying of the stereoscopic image to the other eye.

BACKGROUND OF THE INVENTION

The human brain uses many visual cues to perceive depth, including relative size, lighting and shadows, focusing, and most importantly binocularity. Because the right and left eyes are located at different points in space, each views a scene from a slightly different perspective. This is called binocular parallax. The image of a three dimensional world is largely a construct of the mind generated by comparing and integrating these two slightly disparate two dimensional images.

Optical methods of producing three dimensional illusions by presenting slightly different images to the two eyes are called stereoscopy. One common type of stereo viewer separates the two images spatially and is a direct descendant of the postcard stereo viewer of the 19th century and its predecessor the Wheatstone mirror stereoscope. Virtual reality computer systems used today are often based on this idea and employ head mounted displays which use a pair of small video screens to present stereo pairs of images to the two eyes of the user.

Other systems have also been used to create three dimension illusions. For example, one can use a lenticular screen made of vertical cylindrical lenses and a stereo pair of images which are vertically sliced and alternated in a composite image under the screen. When this composite image is viewed at a certain distance, the right eye sees only the right image and the left eye sees only the left image. This is the basis for three dimension photography which does not require a viewer.

Stereo pairs of images can be time multiplexed so that first an image is presented to the right eye alone and then its stereo pair is presented to the left eye alone. This can be realized by mechanical means or with liquid crystal electronic shutter glasses. These glasses open first the right and then the left eye, while alternately closing the other eye, in synchrony with the changing image on a video monitor (i.e., TV) or other device.

Other methods and systems for generating a stereoscopic image include an anaglyphic system which employs complimentary colored (e.g. red and green) glasses to view a superimposed stereo pair of images which were photographed through filters of the same colors. This system, which is widely known due to its use for motion picture "3-D horror movies", is compatible with video monitors but is not compatible with a true color image. Related systems are also known which use polarized glasses to allow discrimination of right and left eye images projected through vertical and horizontal polarizers. While these systems can be used for true color images, these systems are not useable with a video monitor.

Still other methods used for creating three dimension illusions include random dot stereographs and those based on the Pulfrich effect.

SUMMARY OF THE INVENTION

In accordance with the present invention, a method and system are disclosed for creating a three dimensional viewing illusion in true color using a two dimensional display which can be a video monitor. The steps of the method include the displaying, alternately, of left and right images of a stereo pair with a display device. The left and right images of the stereo pair are designed to be viewed respectively by the left and right eyes of a viewer as a single three dimensional image. Thus, in synchrony with the alternating display of the images, a light is alternately shown from a light source means to the right and left eyes of the viewer. In this manner, while the eyes of the viewer do view both of the left and right stereo images, the contrast of the eye receiving both the light and the stereo image designed for the other eye is reduced and only the eye for which the image was designed effectively sees that image.

In one embodiment of the method, the light source means includes a left and a right collimated light source. The shining step then includes the step of aiming the left and right sources at the respective left and right eyes of the viewer. Preferably, the steps of tracking the position of the eyes of the user and adjusting the aiming of the left and right sources as the viewer moves are also performed.

In another embodiment of the method wherein the light source means includes a left and a right light source, the shining step includes the step of mounting the left and right sources adjacent the associated eye of the viewer on an object which is worn by the viewer.

In still another embodiment wherein the light source means includes a left and a right light source, the shining step includes the steps of polarizing the light emitted from the left source different from the light emitted by the right source. Then, there is mounted to an object which is worn by the viewer a left light filter means for preventing polarized light from the right light source from being passed and hence received by the left eye and a right light filter means for preventing polarized light from the left light source from being passed and hence received by the right eye.

In all embodiments, the shining step preferably includes the step of adjusting the projected intensity of the light source means to adjust the reduction in contrast of the eyes the necessary amount according to the conditions present.

The system of the present invention includes a display means for displaying, alternately, left and right images of the stereo pair and a light source means for shining, alternately, light therefrom to right and left eyes of the viewer synchronously with the displaying of the respective left and right images of the stereo pair. Preferably, the display means is a video monitor such as a television.

In one embodiment of the system, the light source means includes a left and a right collimated light source which are aimed at the respective left and right eyes of the viewer. In this embodiment, the light source means preferably further includes a tracking means for tracking the position of the eyes of the user and adjusting the aiming of the left and right sources as the viewer moves.

In another embodiment of the system, the light source means includes a left and a right light source, and an object which is worn by the viewer on which the left and right sources are mounted adjacent the associated eye of the viewer.

In yet another embodiment of the system, the light source means includes a left and a right light source and means for polarizing the light emitted from the left source different from the light emitted by the right source. Then, there is also provided a left light filter means for preventing polarized light from the right light source from being passed and hence received by the left eye, and similarly a right light filter means for preventing polarized light from the left light source from being passed and hence received by the right eye. Preferably, there is also an object which is worn by the viewer on which the filter means are conveniently mounted.

In all embodiments, the light source means preferably includes an adjustment means for adjusting the projected intensity of the light source means to adjust the reduction in contrast of the eyes the necessary amount according to the conditions present.

It is an advantage of the present invention that a three dimensional viewing illusion in true color is provided.

It is also an advantage of the present invention that the three dimensional viewing illusion can be easily created using a two dimensional display which can be a video monitor such as a television.

It is a further advantage of the present invention that the three dimensional viewing illusion is easily adapted to existing two dimensional display mechanisms of all types.

Other features and advantages of the present invention are stated in or apparent from detailed descriptions of presently preferred embodiments of the invention found hereinbelow.

DETAILED DESCRIPTION OF THE PREFERRED EMBODIMENTS

Figure 1:
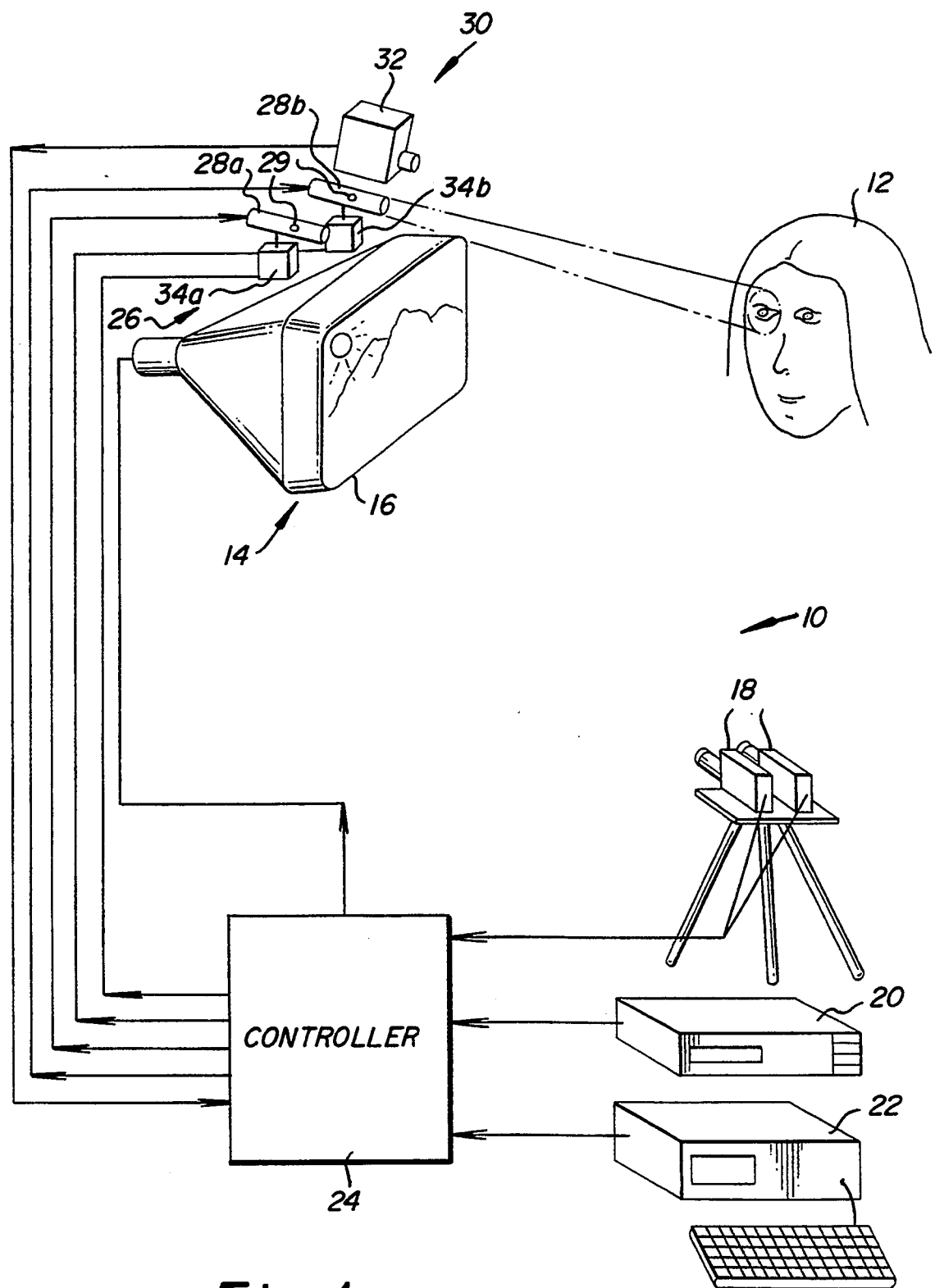
FIG. 1 is a schematic representation of a system for producing a three dimensional viewing illusion using a two dimensional display device according to the present invention.

With reference now to the drawings in which like numerals represent like elements throughout the views, a three dimensional viewing illusion system 10 is schematically depicted in FIG. 1. System 10 is used to create a three dimensional viewing illusion for a user 12. System 10 makes use of the effect of disability glare, which is commonly used to mean a loss of or reduction in contrast of viewed material typically due to an extraneous light source. It should be appreciated that disability glare which reduces visual performance is different from the other type of glare, discomfort glare, which represents subjective discomfort without a measurable effect on visual performance.

Sufficient disability glare can, in a sense, completely obscure the viewed material rendering it essentially non-viewable. For example, when driving at night, an oncoming headlight can render details of the road ahead non-seeable. This same principle is thus employed with the present invention so that the right eye image of a stereo pair is seen only by the right eye and the left eye image only by the left eye. Thus, when the right image of the stereo pair is projected and viewable by both eyes, an additional light source is used to project light into the left eye to significantly reduce the contrast of the right image to the point where details of the right image are not seen by the left eye. The subsequently projected image for the left eye is then similarly washed out of the right eye.

As appreciated by those in the art, the amount of light necessary to provide sufficient disability glare is a function of many different variables. Among these variables are the intensity of the image being viewed and of the glare source, the contrast of the image being viewed, the spatial frequency of the image being viewed, other (background) light sources, the angle between the image being viewed and a source of glare light, and the distances from the eyes to the image being viewed and to the glare source. Due to these many variables, there is no precise measurement of the intensity of received light from the image being viewed and from the glare source which will be sufficient to provide the disability glare needed for the present invention. However, in general applications, it can be approximated that the intensity of the received glare light should be at least equal to that of the image being viewed, though the disability glare received intensity may indeed by orders of magnitude greater than the received image intensity. For best results, the intensity of the glare source is preferably made adjustable. Then, the user can simply adjust the glare source to provide the needed disability glare in view of the whatever circumstances or conditions exist.

As shown in FIG. 1, system 10 includes a display means 14 which is used to display left and right images of the stereo pair. The left and right images of the stereo pair are designed to be viewed respectively by the left and right eyes of user 12 as a single three dimensional image. Such pairs of images are well known in the art and provide the binocular parallax which the eyes are used to. In the depicted embodiment, display means 14 includes a simple video monitor 16 such as a common television. The stereo images can be produced on video monitor 16 using a variety of mechanisms, such as a pair of video cameras 18, a video player 20, or a computer 22 as well known in the art.

In order to create the three dimensional illusion with video monitor 16, system 10 also includes a controller 24. Controller 24 is used to control a light source means which in the depicted embodiment of FIG. 1 includes a left collimated light source 28a aimed at the left eye of user 12 and a right collimated light source 28b aimed at the right eye of user 12. The projected or emitted intensities of both light sources 28a and 28b are adjustable, as by a knob 29. If desired, controller 24 could also be provided with a suitable means for adjusting the projected or emitted intensity of both light sources 28a and 28b. As shown, controller 24 receives the signals producing the stereo images from the appropriate source and monitors the timing of the images passed on to video monitor 16. Where the pair of video cameras 18 is used, controller 24 also alternates (over time) the images of the two cameras to video monitor 16 to produce the images of the stereo pair. Otherwise, controller 24 simply monitors the timing of the images of the pairs previously produced and simply passed to video monitor 16.

Synchronous with the projection of the left image of the stereo pair, controller 24 also activates right light source 28b. Thus, while both eyes of user 12 view the left image projected by video monitor 16, the right eye of the user additionally receives light from right light source 28b (the left eye does not receive any light, as the beam is sufficiently collimated). By selecting a suitable intensity, the light from light source 28b produces sufficient disability glare in the right eye to cause a loss of contrast in the image perceived by the right eye rendering the image essentially non-viewable. On the other hand, the left eye views the left image without interference and thus with full contrast. Subsequently, when the right image replaces the left image on video monitor 16, controller 24 senses this and switches right light source 28b off and switches left light source 28a on. Thus, in a similar manner, the contrast of the left eye viewing the right image is reduced while that of the right eye is not. The net effect of the projection of the two images is therefore the reception by the appropriate eyes of the image designed for that eye and hence an illusion of a three dimensional image produced by video monitor 16.

With video monitor 16, images are presented at a fast rate, such as 30 images per second. Thus, it will be appreciated that light sources 28 must be capable of being turned on and off very quickly, i.e. 30 times a second. Obviously, whatever display means is used will alternate images at some frequency which will thus have to be monitored by controller 24 and matched by the on/off control of light sources 28a and 28b.

In the embodiment described above, it has been indicated that light sources 28a and 28b are aimed at the respective eyes of user 12. Such an aiming is sufficient if the user remained essentially stationary. However, system 10 preferably also includes a tracking means 30 for the eyes of user 12. In this embodiment, tracking means 30 includes a suitable camera 32 which views user 12 and which sends signals back to controller 24. However, it will be appreciated that rather than having an optical tracking means 30, a magnetic, mechanical, or ultrasonic tracking means as known in the art could be used instead. Controller 24 receives the signals from tracking means 30 and determines where light sources 28a and 28b need to be aimed. Based on this determination, controller 24 sends appropriately signals to aiming mechanisms 34a and 34b which appropriate move or adjust associated light sources 28a and 28b as required to keep the light beams therefrom directed at the associated eyes of user 12.

Figure 2:
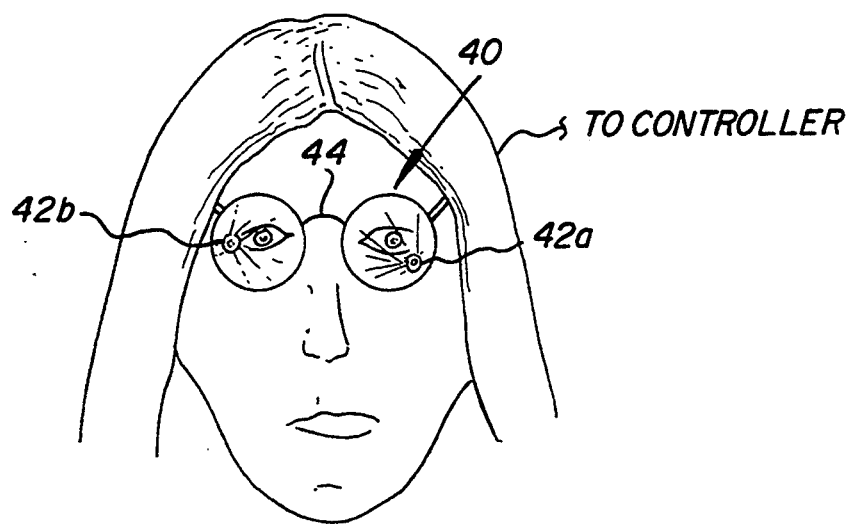
FIG. 2 is a schematic representation of an alternative embodiment of a light projection mechanism for the system depicted in FIG. 1 where the lights are mounted on glasses worn by the user.

Depicted in FIG. 2 is an alternative embodiment of a light source means 40. In this embodiment, light source means 40 includes light sources 42a and 42b which are mounted on an object worn by user 12, in this embodiment glasses Light sources 42a and 42b are appropriately mounted so as to shine into the associated eye of user 12 with little or no light therefrom being received by the other eye. Control of light sources 42a and 42b is then similarly accomplished using controller 24 as discussed above. The primary advantages of this embodiment are that the user is fairly free to move around as desired and due to the closeness of the light sources 42a and 42b, small low intensity light sources can be used. Light sources 42a and 42b would similarly be provided with some sort of projected or emitted intensity adjustment, as with light sources 28a and 28b of the embodiment depicted in FIG. 1.

Figure 3:
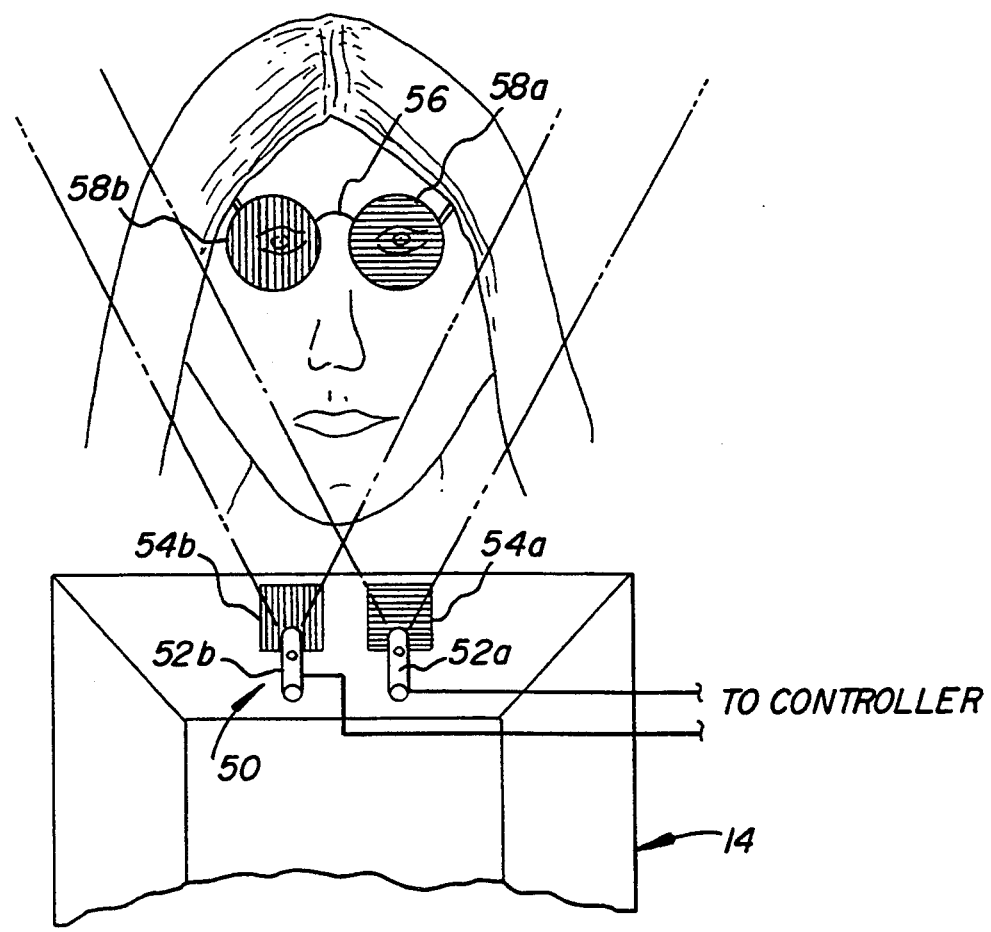
FIG. 3 is a schematic representation of another alternative embodiment of a light projection mechanism for the system depicted in FIG. 1 where the light from the sources are polarized and filters are mounted on glasses worn by the user.

Depicted in FIG. 3 is another alternative embodiment of a light source means 50. In this embodiment, light means 50 includes adjustable intensity left and right wide angle light sources 52a and 52b together with respective polarizing means 54a and 54b which polarize the light emitted from sources 52 differently (such as horizontal and vertical). User 12 then wears glasses 56 or the like which include a left light filter means 58a (i.e., the lens itself) which prevents the light from light source 52a from being received by the left eye of user 12 and a right light filter means 58b which similarly prevents the light from light source 52b from being received by the right eye of user 12. Light sources 52 are then suitably turned on and off by controller 24 to project, through polarizing means 54, polarized light which is blocked by the filter means 58 of the opposite eye.

Thus, when the left eye views the left image designed therefor (except for the small amount of light from the image filtered by left filter means 58a), the left eye does not receive the polarized light emitted by right light source 52b and polarizing means 54b because of left filter means 58a. However, the right eye sees not only the left image but the polarized light from right light source 52b (passing through right polarizing means 54b and then right filter means 58b), reducing the contrast of the right eye. Subsequently, when the right image is then projected, the right eye then views the right image undisturbed while the left eye views the image as well as the polarized light from left light source 52a to reduce the contrast of the left eye.

There are a number of advantages of the embodiment depicted in FIG. 3. One advantage is that the user is free to move about within the range of the light sources (and polarizing means). Another advantage is that relatively large areas can be covered by the light sources and no aiming of the sources is necessary. Still another advantage is that the stereo effect can be appreciated by any number of viewers equipped with appropriately filtered glasses in the range of the light sources (or plurality of sources if necessary or desired). This would be especially advantageous in movie houses or the like where large numbers of viewers would want to participate in the stereo viewing.

The light sources described above would typically by white light sources where used for a true color image or even with a black and white image. However, colored sources could also be used with corresponding color images. For example, red light sources could be used with red left and right images. Similarly, red and green light sources could be used with corresponding red and green stereo images.

The particular type of light source used would also depend on the embodiment chosen and the desires of the user. Potentially any light source could be used so long as it was capable of being turned on and off very rapidly. Suitable sources would thus include light emitting diodes, lasers, and xenon flash tubes. Other sources of light which do not turn on and off rapidly, such as incandescent or fluorescent, could also be used if the output thereof could be modulated rapidly by electro-optical or even mechanical mechanisms. Besides adjusting the intensity of the light source(s), it will also be appreciated that suitable adjustable filters or the like could also be used to adjust the intensity of the projected light.

In accordance with the method of the present invention for producing a three dimensional viewing illusion using a two dimensional display, display means 14 is used to display, alternately, left and right images of the stereo pair. These images are viewed by both the left and right eyes of user 12. However, at the same time that the left image is being viewed by both eyes, light from right light source 28b is directed into the right eye of user 12. By suitably adjusting the projected intensities of light sources 28a and 28b, a disability glare is provided to each eye by the associated light source. This causes the contrast of the left image viewed with the right eye to be reduced, effectively preventing details of the left image from being seen with the right eye. Similarly, when the right image is projected, the left eye is prevented from seeing details thereof by the shining into the left eye of light from left light source 28a. The net effect is that the associated eyes view in detail only the appropriate left or right image, resulting in the creation of a three dimensional illusion of the image.

In one embodiment, the light sources are aimed at the eyes of user 12 using collimated light sources, which can be stationary if the user is similarly (relatively) stationary. If it is desired to allow the user to move about somewhat, the light sources are then made movable or adjustable so that by tracking the movement of the user the light sources are appropriately aimed to follow the user. As an alternative, the light sources can be mounted on the user and adjacent the eyes of the user. As a further alternative, the light sources can be polarized differently and the eyes of the user provided with different polarized light filters.

While the present invention has been described with respect to exemplary embodiments thereof, it will be understood by those of ordinary skill in the art that variations and modifications can be effected within the scope and spirit of the invention.

I claim:

1. A system for producing a three dimensional viewing illusion comprising:
   a display means for displaying, alternately, left and right images of a stereo pair which left and right images of the stereo pair are designed to be viewed respectively by the left and right eyes of a viewer as a single three dimensional image;
   a light source means for shining, alternately, light therefrom to right and left eyes of the viewer synchronously with the displaying of the respective left and right images of the stereo pair so that while the eyes of the viewer do view both of the left and right stereo images, the contrast of the eye receiving both the light and the stereo image designed for the other eye is reduced.

2. A system for producing a three dimensional viewing illusion as claimed in claim 1 wherein said light source means includes a left and a right collimated light source which are aimed at the respective left and right eyes of the viewer.

3. A system for producing a three dimensional viewing illusion as claimed in claim 2 wherein said light source means further includes a tracking means for tracking the position of the eyes of the viewer and adjusting the aiming of the left and right light sources as the viewer moves.

4. A system for producing a three dimensional viewing illusion as claimed in claim 1 wherein the light source means includes a left and a right light source, and an object which is worn by the viewer on which the left and right light sources are mounted adjacent the associated eye of the viewer.

5. A system for producing a three dimensional viewing illusion as claimed in claim 1 wherein the light source means includes a left and a right light source, means for polarizing the light emitted from the left source different from the light emitted by the right source, a left light filter means for preventing polarized light from said right light source from being passed and hence from being received by the left eye, a right light filter means for preventing polarized light from said left light source from being passed and hence from being received by the right eye, and an object which is worn by the viewer on which said left and right light filter means are mounted.

6. A system for producing a three dimensional viewing illusion as claimed in claim 1 wherein said display means is a video monitor.

7. A system for producing a three dimensional viewing illusion as claimed in claim 1 wherein said light source means includes a means for adjusting the projected light intensity thereof to compensate for existing conditions.

8. A method for producing a three dimensional viewing illusion comprising the steps of:
   displaying, alternately, left and right images of a stereo pair with a display device which left and right images of the stereo pair are designed to be viewed respectively by the left and right eyes of a viewer as a single three dimensional image;
   shining, alternately, light from a light source means to right and left eyes of the viewer synchronously with the displaying of the respective left and right images of the stereo pair so that while the eyes of the viewer do view both of the left and right stereo images, the contrast of the eye receiving both the light and the stereo image designed for the other eye is reduced.

9. A method for producing a three dimensional viewing illusion as claimed in claim 1 wherein the light source means includes a left and a right collimated light source, and wherein said shining step includes the step of aiming the left and right light sources at the respective left and right eyes of the viewer.

10. A method for producing a three dimensional viewing illusion as claimed in claim 9 wherein said shining step includes the steps of tracking the position of the eyes of the viewer and adjusting the aiming of the left and right light sources as the viewer moves.

11. A method for producing a three dimensional viewing illusion as claimed in claim 1 wherein the light source means includes a left and a right light source, and wherein said shining step includes the step of mounting the left and right light sources adjacent the associated eye of the viewer on an object which is worn by the viewer.

12. A method for producing a three dimensional viewing illusion as claimed in claim 1 wherein the light source means includes a left and a right light source; and wherein said shining step includes the steps of polarizing the light emitted from the left source different from the light emitted by the right source, and mounting to an object which is worn by the viewer a left light filter means for preventing polarized light from said right light source from being passed and hence from being received by the left eye and a right light filter means for preventing polarized light from said left light source from being passed and hence from being received by the right eye.

13. A method for producing a three dimensional viewing illusion as claimed in claim 1 wherein said shining step includes the step of adjusting the projected light intensity of the light source means to adjust the reduction in contrast of the eyes to compensate for existing conditions.

* * * * *